(12) United States Patent
Nayler

(10) Patent No.: US 7,233,616 B1
(45) Date of Patent: Jun. 19, 2007

(54) ARRANGEMENT FOR INITIALIZING DIGITAL EQUALIZER SETTINGS BASED ON COMPARING DIGITAL EQUALIZER OUTPUTS TO PRESCRIBED EQUALIZER OUTPUTS

(75) Inventor: Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1250 days.

(21) Appl. No.: 10/002,185

(22) Filed: Dec. 5, 2001

(51) Int. Cl.
*H03B 1/10* (2006.01)

(52) U.S. Cl. ...................... 375/231; 375/350; 375/232; 375/233

(58) Field of Classification Search ................ 375/350, 375/229, 230, 231, 232, 233, 236, 348, 327; 333/18, 28 R; 708/323; 381/103
See application file for complete search history.

(56) References Cited

U.S. PATENT DOCUMENTS

| | | | | |
|---|---|---|---|---|
| 3,292,110 A * | 12/1966 | Becker et al. | ................ | 333/18 |
| 5,027,369 A * | 6/1991 | Kuenast | ...................... | 375/233 |
| 5,517,527 A * | 5/1996 | Yu | ............................. | 375/233 |
| 6,069,917 A * | 5/2000 | Werner et al. | .............. | 375/233 |
| 6,097,767 A * | 8/2000 | Lo et al. | ..................... | 375/327 |
| 6,104,236 A | 8/2000 | Tsinker | ...................... | 327/557 |
| 6,144,697 A * | 11/2000 | Gelfand et al. | ............ | 375/233 |
| 6,240,131 B1 | 5/2001 | Cheng et al. | ............... | 375/229 |
| 6,870,881 B1 * | 3/2005 | He | ............................ | 375/233 |
| 6,876,699 B1 * | 4/2005 | Chadha et al. | .............. | 375/233 |

OTHER PUBLICATIONS

Vijay Madisetti & Douglas Wiliams, "The digital signal processing handbook", 1998, section VI "Adaptive Filtering"chapters 18-24.*
Ramirez Diniz, "Adaptive Filtering Algorithms and practical implementation", 1997.*
Sergio Benedetto, "Principles of Digital Transmission with wireless applications", 1999, chapter 8 pp. 380-426.*

* cited by examiner

*Primary Examiner*—Temesghen Ghebretinsae
*Assistant Examiner*—Juan Alberto Torres
(74) *Attorney, Agent, or Firm*—Manelli Denison & Selter PLLC; Leon R. Turkevich

(57) ABSTRACT

A physical layer transceiver, configured for retrieving signal samples from a prescribed network medium having an undetermined length, includes a digital feedforward equalizer, configured for generating equalized signal samples from the retrieved signal samples and based on supplied equalizer settings, and an equalizer controller. The equalizer controller is configured for supplying selected equalizer settings that overcome intersymbol interference encountered by transmission of the signal samples across the prescribed network medium. The equalizer controller is configured for supplying prescribed initial equalizer settings to the digital feedforward equalizer, receiving equalized signal samples from the digital feedforward equalizer, and selectively changing the prescribed initial equalizer settings based on comparing the equalized signal samples to a prescribed equalization threshold. The equalizer controller is configured for selectively repeating the changing of the equalizer settings until the equalized signal samples reach the prescribed equalization threshold.

13 Claims, 3 Drawing Sheets

ARRANGEMENT FOR INITIALIZING DIGITAL EQUALIZER SETTINGS BASED ON COMPARING DIGITAL EQUALIZER OUTPUTS TO PRESCRIBED EQUALIZER OUTPUTS

BACKGROUND OF THE INVENTION

1. Field of the Invention

The present invention relates to initializing a digital equalizer in a physical layer transceiver configured for receiving network signals from a prescribed network medium, such as a 100Base-TX network medium.

2. Background Art

Local area networks use a network cable or other network media to link nodes (e.g., workstations, routers and switches) to the network. Each local area network architecture uses a media access control (MAC) enabling network interface device at each network node to share access to the medium.

Physical (PHY) layer devices are configured for translating digital packet data received from a MAC across a standardized interface, e.g., a Media Independent Interface (MII), into an analog signal for transmission on the network medium, and recovering digital packet data from the analog signals transmitted from a remote node via the network medium. An example is the 100Base-TX Ethernet (IEEE Standard 802.3) receiver, configured for receiving an encoded analog signal at a 100 Mb/s data rate. The 100Base-TX Ethernet receiver typically will include a slicer to recover symbols from digitized samples of the analog signal.

One problem associated with recovering packet data from a wired network medium involves the need to overcome intersymbol interference encountered during transmission of packet data at longer cable lengths. For example, data communications using 100Base-TX may be implemented using a cable having any length between 0 and 100 meters. Since the cable length is variable, an adaptive arrangement is needed to determine the amount of equalization necessary to overcome intersymbol interference.

Digital receivers typically perform equalization to overcome intersymbol interference using decision feedback equalizers having a combination of a feedforward filter and a feedback filter. The feedforward filter and feedback filter typically are finite impulse response (FIR) filters controlled by a set of FIR coefficients. The optimal coefficients for the feedforward filter and the feedback filter typically are determined using an adaptive algorithm, known as the Least Mean Squares (LMS) algorithm. In particular, the LMS algorithm operates to minimize Mean Square Error by adjusting the values of the FIR filter coefficients.

Many networking environments, however, such as the 100 BaseT Ethernet environment, do not provide a known training sequence to enable the LMS algorithm to select FIR filter coefficients based on prescribed symbol values, requiring the digital receiver to "blindly" (i.e., without a known training sequence) determine the FIR filter coefficients. Moreover, the intersymbol interference encountered during transmission on the network medium renders the symbol data output by the slicer too unreliable for successful completion of a decision directed algorithm, such as the LMS algorithm. Hence, the PHY receiver in some cases may not be able to rely on symbol data to select FIR coefficients that reliably overcome intersymbol interference.

SUMMARY OF THE INVENTION

There is a need for an arrangement in a physical layer transceiver, configured for receiving analog signals from a prescribed network medium and carrying symbols, that enables digital equalizer settings to be established for reliable reception of the symbols, without the necessity of relying on symbol data from a slicer that may encounter intersymbol interference.

There also is a need for an arrangement in a physical layer transceiver that enables digital equalizer settings to be established, for a prescribed network medium having an unknown length, for reliable equalization of the symbols having encountered intersymbol interference to overcome the intersymbol interference.

These and other needs are attained by the present invention, where a physical layer transceiver configured for retrieving signal samples from a prescribed network medium having an undetermined length includes a digital feedforward equalizer, configured for generating equalized signal samples from the retrieved signal samples and based on supplied equalizer settings, and an equalizer controller. The equalizer controller is configured for supplying selected equalizer settings that overcome intersymbol interference encountered by transmission of the signal samples across the prescribed network medium. In particular, the equalizer controller is configured for selecting the selected equalizer settings based on supplying prescribed initial equalizer settings to the digital feedforward equalizer, receiving equalized signal samples from the digital feedforward equalizer having equalized the retrieved signal samples based on the initial equalizer settings, and selectively changing the prescribed initial equalizer settings based on comparing the equalized signal samples to a prescribed equalization threshold. The equalizer controller is configured for selectively repeating the changing of the equalizer settings until the equalized signal samples reach the prescribed equalization threshold. Hence, the digital feedforward equalizer can be initialized with equalizer settings to overcome the intersymbol interference, without relying on recovery of symbols from the signal samples.

One aspect of the present invention provides a method in a physical layer transceiver coupled to a prescribed network medium having an undetermined length. The method includes supplying a prescribed initial set of equalizer settings to a digital feedforward equalizer, the digital feedforward equalizer configured for outputting equalized signal samples based on equalizing retrieved signal samples, having encountered intersymbol interference by transmission via the prescribed network medium, according to supplied equalizer settings. The method also includes comparing the equalized signal samples relative to a prescribed equalization threshold, and selectively changing the supplied equalizer settings, based on the comparing step, until the equalized signal samples reach the prescribed equalization threshold.

Supplying the prescribed initial set of equalizer settings enables the digital feedforward equalizer to begin equalizing the retrieved signal samples, regardless of whether other portions of the physical layer transceiver, such as the slicer, timing recovery unit, etc., have been able to begin recovery of information from the retrieved signal samples. Moreover, the selective changing of the supplied equalizer settings until the equalized signal samples reach the prescribed equalization threshold enables the independent initialization of the digital feedforward equalizer, enabling other portions such as the timing recovery unit to begin recovery of information concurrent with the independent initialization of the digital feedforward equalizer, improving the physical layer transceiver efficiency in establishing timing recovery and intersymbol interference equalization for symbol recovery.

Another aspect of the present invention provides a physical layer transceiver configured for retrieving signal samples from a prescribed network medium having an undetermined length. The physical layer transceiver includes a digital feedforward equalizer configured for generating equalized signal samples from the retrieved signal samples and based on supplied equalizer settings, the retrieved signal samples having encountered intersymbol interference by transmission via the prescribed network medium. The physical layer transceiver also includes an equalizer controller configured for supplying the supplied equalizer settings to the digital feedforward equalizer. The equalizer controller is configured for supplying a prescribed initial set of equalizer settings and comparing the equalized signal samples, having been generated based on the initial set of equalizer settings, relative to a prescribed equalization threshold. The equalizer controller also is configured for selectively changing the supplied equalizer settings until the equalized signal samples reach the prescribed equalization threshold.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
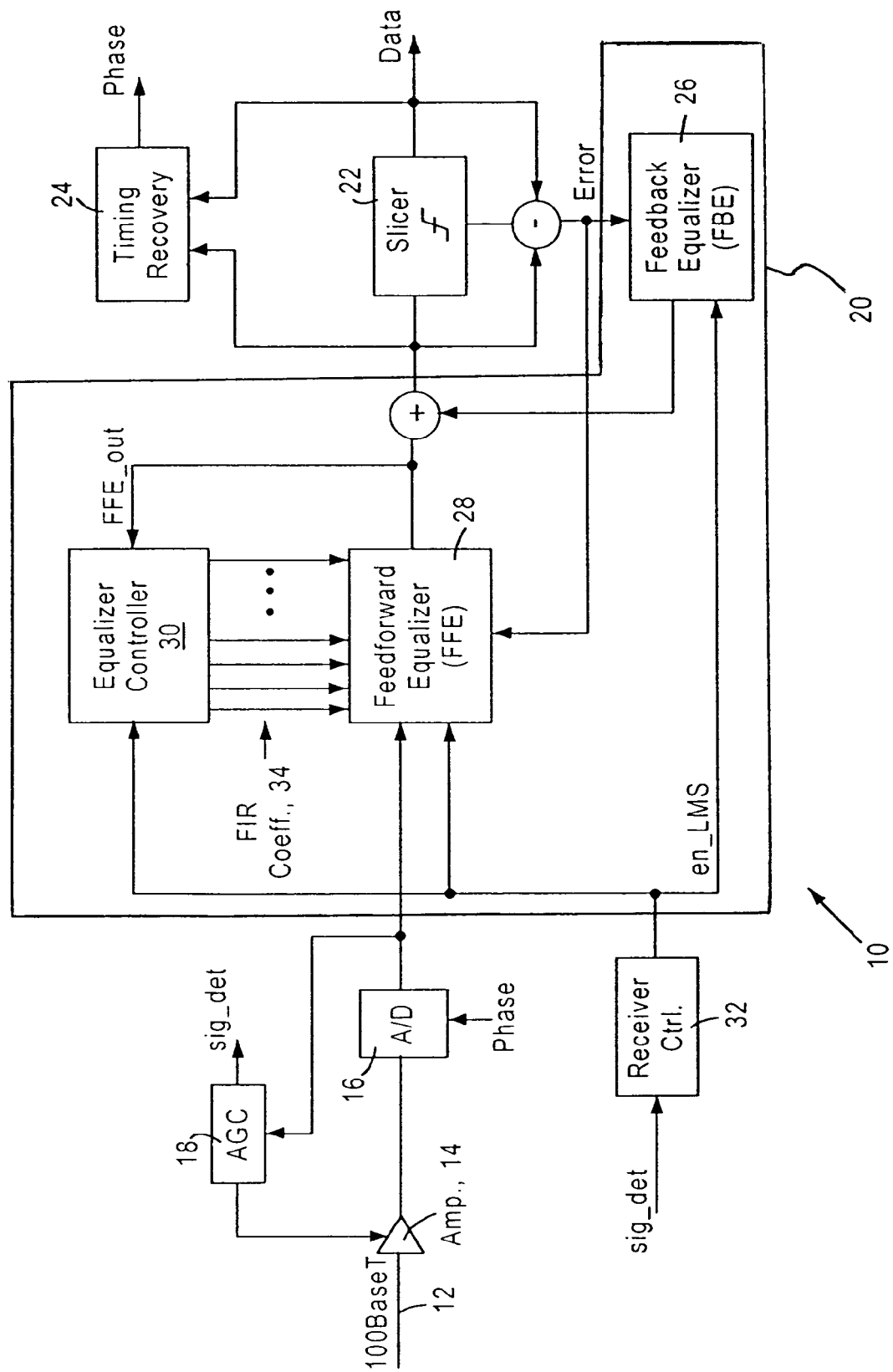
FIG. 1 is a block diagram illustrating a receiver portion of a physical layer transceiver configured for receiving network signals from a prescribed network medium, according to an embodiment of the present invention.

FIG. 1 is a block diagram illustrating a receiver portion 10 of a physical layer transceiver configured for receiving packet data from a prescribed network medium 12, according to an embodiment of the present invention. The network medium 12, for example a 100Base-TX Ethernet cable, may have a cable length between 0 and 100 meters. Hence, severe inter-symbol interference may be encountered by network data during transmission on the network medium 12 as the length of the cable increases.

The inventor has discovered that the electrical properties of the network medium 12 can be reliably characterized at different lengths. In particular, use of a prescribed network medium, for example Category 5 unshield twisted pair wire for 100Base-TX for a point-to-point connection without any bridged taps, has prescribed electrical characteristics that can be used for establishing prescribed equalizer settings within the physical layer transceiver 10. In particular, the inventor has learned that signal attenuation on the network medium 12 increases with frequency, and that attenuation at high frequencies is greater for longer lengths of cable. In addition, the attenuation increases monotonically as the length of the cable increases. Hence, the network medium 12 can be characterized for short cable lengths to long cable lengths, to establish a range of equalizer settings to compensate for intersymbol interference. These established equalizer settings can then be implemented within a physical layer transceiver, either logically or as a set of lookup tables storing the equalizer settings for respective cable lengths. In addition, the expected performance for an equalized signal can be experimentally determined, and programmed within the physical layer transceiver 10, described below.

Hence, the physical layer transceiver 10 can be configured for determining an optimum equalizer setting based on applying an initial set of equalizer settings for equalizing signals samples retrieved from a prescribed network medium having an undetermined length; the equalized signal samples can then be compared to a prescribed equalization threshold, and the supplied equalizer settings can be selectively changed until the equalized signal samples reach the prescribed equalization threshold.

As illustrated in FIG. 1, the physical layer transceiver 10 includes a variable gain amplifier 14, an analog to digital (A/D) converter 16, and an automatic gain controller 18. The variable gain amplifier 14 is configured for preamplifying the analog network signal from the network medium 12, and outputting the amplified signal to the analog to digital converter 16. The analog to digital converter 16 samples the waveform at a known sampling rate, for example 125 Megahertz in order to retrieve signal samples representing the analog waveform. The retrieved signal samples, representing the analog waveforms and having encountered intersymbol interference by transmission via the 100Base-TX medium 12, need to be digitally equalized in order to provide equalized samples that can be reliably analyzed (i.e., sliced) in order to recover the data symbols.

The receiver 10 include a decision feedback equalizer circuit 20 configured for generating an equalized signal to overcome the intersymbol interference, a slicer circuit 22, and a timing recovery unit 24. The decision feedback equalizer circuit 20, described below, is configured equalizing the retrieved signal samples output by the analog to digital converter 16, enabling the slicer 22 to recover the data symbols output by the transmitting network node. The timing recovery unit 24, configured for determining the phase of the signal based on comparing the outputs of the slicer, is used to more precisely control the A/D converter 16.

The decision feedback equalizer circuit 20 includes a feedback equalizer 26, a feedforward equalizer 28, and an equalizer controller 30, each of which are controlled by a receiver controller 32. The decision feedback equalizer circuit 20 is configured for optimizing equalization using an adaptive algorithm, for example the LMS algorithm. However, there is a need for an arrangement that enables the equalized signal output by the decision feedback equalizer circuit 20 to have sufficient equalization during initialization to enable the convergence of the decision feedback equalizer 20 to provide stable data. In particular, the feedback equalizer 26 and the timing recovery unit 24 rely on the output of the slicer 22 in order to provide error corrections; however, during initialization, the slicer 22 does not yet have reliable data, resulting in the risk that the decision feedback equalizer 20 may diverge to output inaccurate data due to the unreliability of the data output from the slicer 22 during initialization.

According to the disclosed embodiment, the decision feedback equalizer 20 is configured for initializing digital equalizer settings, based on comparing the output of the decision feedback equalizer 20 with prescribed equalized outputs, independent of the output of the slicer 22. In particular, the receiver controller 32 disables the feedback equalizer 26 during initialization, relying solely on the feedforward equalizer 28 and the equalizer controller 30 for initial equalization of the retrieved signal samples to a prescribed equalization threshold representing stable, equalized signal samples. Once the feedforward equalizer 28 has equalized the retrieved signal samples from the A/D converter 16 to a sufficient equalized level to ensure that the slicer 22 can output reliable data, the receiver controller 32 enables the LMS algorithm to complete the equalization process using the feedback equalizer 26 in combination with the feedforward equalizer 28.

Figure 2:
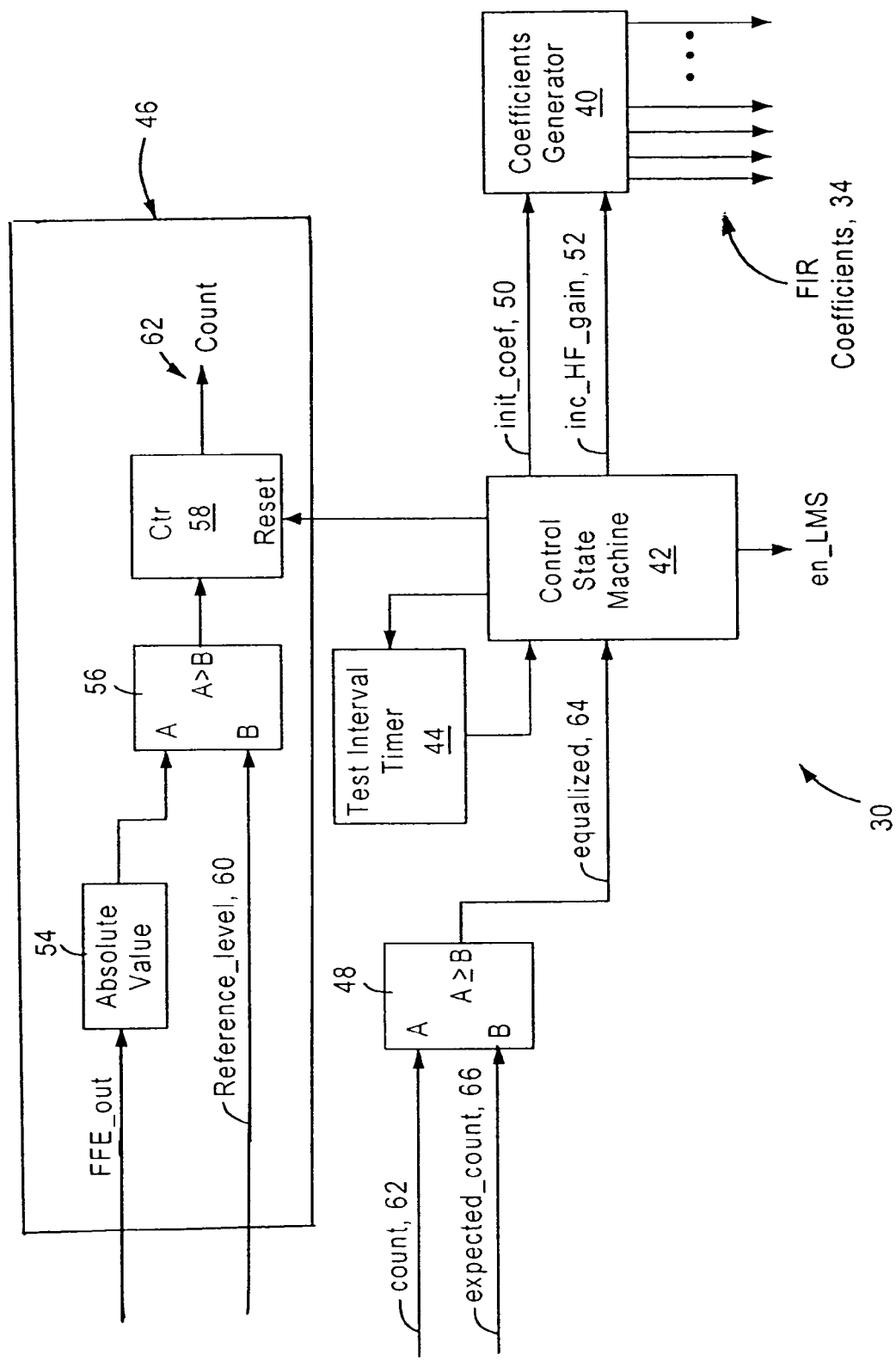
FIG. 2 is a block diagram illustrating in detail the equalizer controller of FIG. 1, according to an embodiment of the present invention.

FIG. 2 is a block diagram illustrating in detail the equalizer controller 30 of FIG. 1 according to an embodiment of the present invention. The equalizer controller 30 includes a coefficients generator 40, a controller state machine 42, a test interval timer 44, a counter circuit 46, and a comparator 48.

The coefficients generator 40 is configured for outputting the equalizer settings 34 to the feedforward equalizer 28 based on control signals output by the control state machine 42. In particular the coefficients generator 40 is configured for outputting a prescribed initial set of equalizer settings, for example equalizer settings for a minimal cable length (e.g., 1 to 5 meters), in response to an initial coefficients signal 50 output by the control state machine 42. As previously described, minimal interference is encountered if the length of the network medium 12 has a minimal length; hence the initial set of equalizer settings may be set approximately to 0 for all the finite impulse response (FIR) coefficients, also referred to as taps, except for the dominant tap which is set to "1".

The coefficients generator 40 also is configured for outputting a different set of coefficients 34 for the feedforward equalizer 28 in response to a change signal 52 output by the control state machine 42, illustrated in FIG. 2 as an increase high frequency gain (inc_HF_gain) signal. The change signal 52 output by the control state machine 42 enables the successive changing of the supplied equalizer settings 34 to accommodate successively changing lengths of the network medium 12, enabling the control state machine 42 to selectively change the supplied equalizer settings 34 until the equalizer signal samples output by the feedforward equalizer 28 reach a prescribed equalization threshold.

Hence, a feedforward equalizer 28 can easily be initialized by initially setting the FIR coefficients 34 output by the coefficients generator 40 to initial values corresponding to a minimal cable length; if the equalized signal samples are not sufficiently equalized relative to the prescribed equalization threshold, described below, the control state machine 42 asserts the change signal 52, to increase the high frequency gain by outputting the next set of FIR coefficients suitable for a longer cable length. Hence, the control state machine 42 can successively assert the change signal 52, causing the coefficients generator 40 to successively output respective equalizer settings 34 for longer cable lengths, until the equalized signal samples output by the feedforward equalizer 28 reach the prescribed equalization threshold.

The test interval timer 44 is configured for generating a statistically significant count interval that defines a number of the equalized signal samples that need to be analyzed before reaching a statistical determination with respect to the prescribed equalization threshold. The control state machine 42 uses the timer 44 to output a reset signal for a new sampling interval.

The counter circuit 46 includes an absolute value circuit 54, a comparator 56 and a counter 58. The counter circuit 46 is configured for counting a number of equalized signal samples having an absolute value that exceeds a reference level 60. In particular, the absolute value circuit 54 outputs the absolute value of the equalized output (FFE_out) to the comparator 56; the comparator 56 outputs a pulse if the absolute value of the equalized signal exceeds the reference level 60. The reference level 60 represents a threshold that identifies statistically where a substantial number of the data values representing a symbol absolute value of "1" should occur for an equalized signal, given that the incoming signal contains pseudorandom data according to the 100Base-TX idle sequence. Hence, the counter 58 determines, within the counter interval specified by the timer 44, the number of equalized signal samples that have an absolute value exceeding the reference level 60. The reference level 60 can be determined experimentally, for example, based on prescribed electrical requirements for the physical layer transceiver 10, or can be based on signal information obtained from the automatic gain controller 18 during signal detection.

The counted number (count) 62 is supplied to the comparator 48 for comparison with the prescribed equalization threshold 66, implemented for example as an expected number of detected signal samples that have an absolute value exceeding the reference level within the count interval. In particular, a transmitting network node constantly transmits signal samples on a network medium 12, regardless of whether valid data is being output (e.g., idle symbols). Hence, the comparator 48 compares the actual number of absolute value signal samples exceeding the reference level 60 to the expected number of absolute value signal samples that should exceed the reference level. The comparator 48 outputs an equalization status signal 64 based on whether the count number 62 reaches the prescribed equalization threshold 66.

Figure 3:
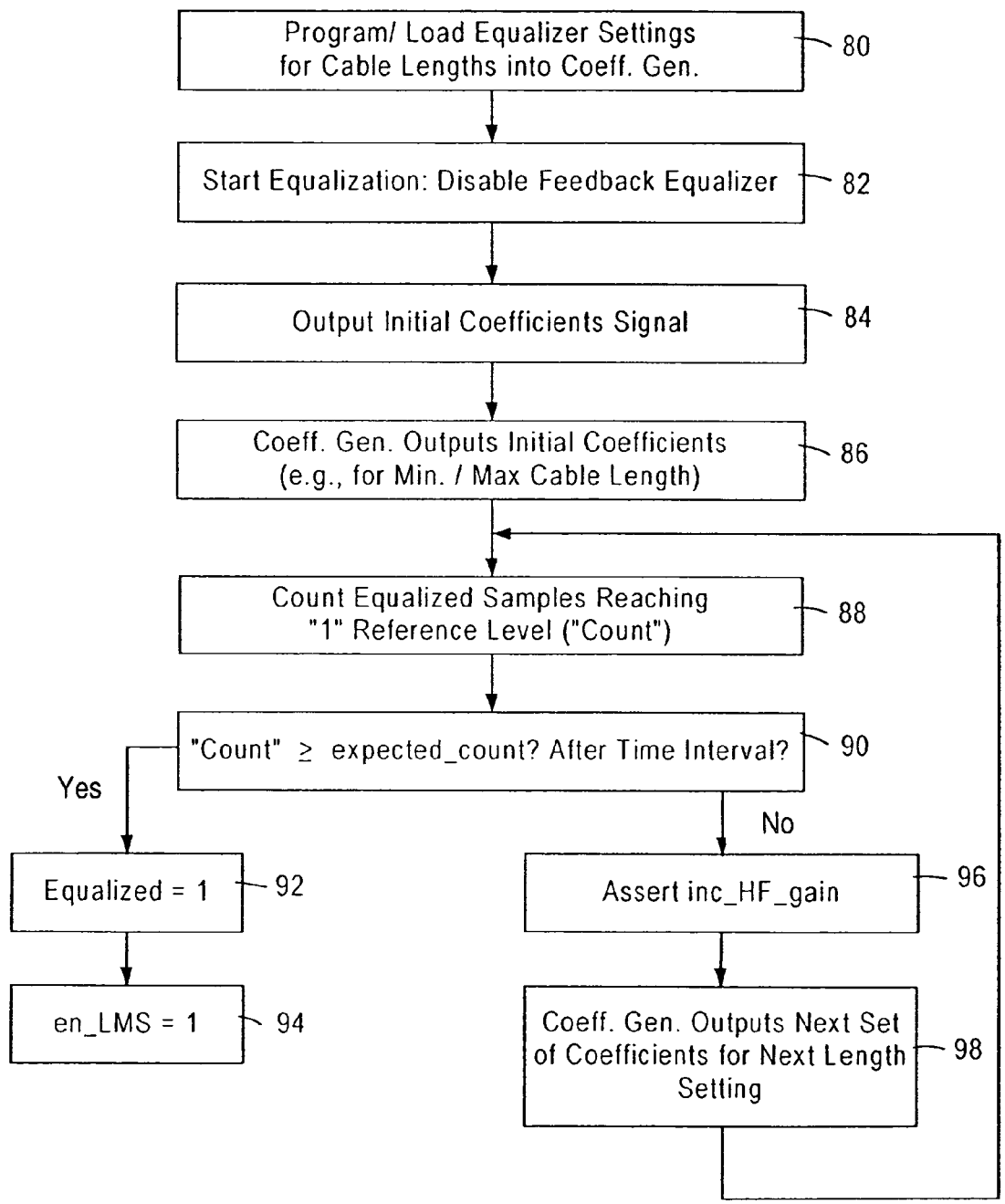
FIG. 3 is a flow diagram illustrating the method of initializing digital equalizer settings based on prescribed equalized outputs, according to an embodiment of the present invention.

FIG. 3 is a flow diagram illustrating the method of initializing the feedforward equalizer 28 to determine equalizer settings 26 necessary for eliminating intersymbol interference, according to an embodiment of the present invention. The method begins in step 80, where the coefficients generator 40 is loaded with the prescribed set of equalizer settings for respective cable lengths. For example, the coefficients generator 40 may be loaded with a table of equalizer settings for respective cable lengths; alternately, the coefficients generator 40 may be implemented using logic that successively changes the existing set of equalizer settings based on prescribed mapping characteristics. As described previously, equalizer settings for increasing cable lengths have been determined to use FIR coefficients that increase, in magnitude, in a monotonic manner.

Once the coefficients generator 40 has been properly configured to generate the necessary settings 34 for different cable lengths, the decision feedback equalizer initialization begins in step 82 by the receiver controller 32 disabling the feedback equalizer 26, for example by setting all the FIR coefficients for the feedback equalizer 26 to zero.

The equalizer controller 30 starts in step 84 the feedforward equalizer initialization, for example in response to a start signal from the receiver controller 32, where the control state machine outputs the initial coefficients signal 50 the coefficients generator 40. The coefficients generator 40 outputs in step 86 the prescribed initial set of equalizer settings for the minimal cable length to the digital feedforward equalizer 28, causing the digital feedforward equalizer 28 to equalize the retrieved signal samples from the A/D converter 16.

The counter circuit 46 counts in step 88 the number of signal samples ("Count") having an absolute value that exceeds the reference level 60 that represents a location where a statistically substantial number of the data values representing a symbol absolute value of "1" should occur for an equalized signal. The comparator 48 determines in step 90 whether the counted number 62 reaches the prescribed equalization threshold ("expected_count") 66; if the counted number 62 reaches the prescribed equalization threshold 66, then the comparator 48 outputs in step 92 an equalized signal 64, enabling the control state machine 42 to assert in step 94 an enable LMS signal (en_LMS) to enable completion of the equalizer adjustment using the LMS algorithm and the feedback equalizer 26. However, if in step 90 the counted number ("Count") 62 does not reach the expected count ("expected_count") 66 at the end of the time interval, the control state machine 42 asserts the change signal ("inc_HF_gain") 52, causing the coefficients generator 40 to output in step 96 the next set of FIR coefficients for the next successively longer cable length in step 98. Hence, the control state machine 42 selectively changes the supplied equalizer settings 34, based on comparing the counted value 62 with the expected prescribed equalization threshold 66, until the equalized signal samples reach the prescribed equalization threshold.

According to the disclosed embodiment, equalizer settings for a feedforward equalizer can be determined for a network medium having an undetermined cable length, without the necessity of relying on symbol data output by a slicer. Hence, the feedforward equalizer 28 can more reliably equalize the retrieved samples, resulting in the conversion of the equalizer system 20. Moreover, since the equalized signal quality improves as the feedforward equalizer 28 is adjusted during initialization, the timing recovery operations by the timing recovery circuit 24 can be performed concurrently with the initialization of the feedforward equalizer 28, enabling the LMS based equalization to be completed more quickly.

Although the disclosed embodiment has been described with respect to testing the equalizer settings using FIR coefficients for successively longer cable lengths, various modifications may be made, including starting with FIR coefficients for a maximum length cable (e.g., 100 meters) and successively changing the equalizer settings 34 for shorter cable lengths.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a physical layer transceiver coupled to a prescribed network medium having an undetermined length, the method comprising:

supplying a prescribed initial set of equalizer settings to a digital feedforward equalizer, the digital feedforward equalizer configured for outputting equalized signal samples based on equalizing retrieved signal samples, having encountered intersymbol interference by transmission via the prescribed network medium, according to supplied equalizer settings;

comparing the equalized signal samples relative to a prescribed equalization threshold; and selectively changing the supplied equalizer settings, based on the comparing step, until the equalized signal samples reach the prescribed equalization threshold.

2. The method of claim 1, wherein the supplying step includes supplying the prescribed initial set of equalizer settings based on a predetermined characterization of the prescribed network medium at a prescribed length.

3. The method of claim 2, wherein the selectively changing step includes successively supplying groups of equalizer settings based on the predetermined characterizations of the prescribed network medium at successively changing lengths, respectively.

4. The method of claim 3, wherein the comparing step includes:

generating a count interval representing reception of a statistically-based prescribed number of signal samples;

first determining, within the count interval, a first number of the equalized signal samples having an absolute value that exceeds a first reference level representing a location where a statistically substantial number of the data values representing a symbol absolute value of "1" should occur for an equalized signal; and second determining whether the first number reaches the prescribed equalization threshold, the prescribed equalization threshold representing an expected number of detected signal samples that exceed the first reference level within the count interval.

5. The method of claim 1, wherein the comparing step includes:

generating a count interval representing reception of a statistically-based prescribed number of signal samples;

first determining, within the count interval, a first number of the equalized signal samples having a first absolute value that exceeds a first reference level representing a location where a statistically substantial number of the data values representing an absolute symbol value of "1" should occur for an equalized signal; and second determining whether the first number reaches the prescribed equalization threshold, the prescribed equalization threshold representing an expected number of detected signal samples that exceed the first reference level within the count interval.

6. The method of claim 1, wherein the prescribed equalization threshold represents an expected number of detected signal samples having been detected within a prescribed count interval and having an absolute value exceeding a reference level.

7. The method of claim 6, wherein the reference level identifies a prescribed minimum value necessary for an ideal equalized signal sample to be detected as a prescribed data value.

8. A physical layer transceiver configured for retrieving signal samples from a prescribed network medium having an undetermined length, the physical layer transceiver comprising:

a digital feedforward equalizer configured for generating equalized signal samples from the retrieved signal samples and based on supplied equalizer settings, the retrieved signal samples having encountered intersymbol interference by transmission via the prescribed network medium; and an equalizer controller configured for supplying the supplied equalizer settings to the digital feedforward equalizer, the equalizer controller configured for supplying a prescribed initial set of equalizer settings and comparing the equalized signal samples, having been generated based on the initial set of equalizer settings, relative to a prescribed equalization threshold, the equalizer controller configured for selectively changing the supplied equalizer settings until the equalized signal samples reach the prescribed equalization threshold.

9. The transceiver of claim 8, wherein the equalizer controller includes a coefficients generator configured for outputting the prescribed initial set of equalizer settings and the selectively changed equalizer settings based on a predetermined characterization of the prescribed network medium at respective prescribed lengths.

10. The transceiver of claim 9, wherein the equalizer controller further comprises a controller state machine configured for asserting an initial signal at initialization of the digital feedforward equalizer and a change signal based on a comparison result between the equalized signal samples and the prescribed equalization threshold, the coefficients generator configured for outputting a corresponding group of equalizer settings representing a successively changing network medium length in response to each corresponding assertion of the change signal.

11. The transceiver of claim 10, wherein the equalizer controller further comprises:

a timer configured for generating a count interval representing reception of a statistically-based prescribed number of signal samples;

a counter configured for determining, within the count interval, a first number of the equalized signal samples having an absolute value that exceeds a first reference level representing a location where a statistically substantial number of the data values representing a symbol absolute value of "1" should occur for an equalized signal; and a comparator configured for outputting an equalization status signal based on whether the first number reaches the prescribed equalization threshold, the prescribed equalization threshold representing an expected number of detected signal samples that have an absolute value exceeding the first reference level within the count interval, the controller state machine selectively asserting the change signal based on the equalization status signal.

12. The transceiver of claim 8, wherein the prescribed equalization threshold represents an expected number of detected signal samples been detected within a prescribed count interval and having an absolute value exceeding a reference level.

13. The transceiver of claim 12, wherein the reference level identifies a prescribed minimum value necessary for an ideal equalized signal sample to be detected as a prescribed data value.

* * * * *